(12) United States Patent
Debevec et al.

(10) Patent No.: US 9,123,116 B2
(45) Date of Patent: Sep. 1, 2015

(54) MULTIVIEW FACE CAPTURE USING POLARIZED SPHERICAL GRADIENT ILLUMINATION

(75) Inventors: Paul E. Debevec, Culver City, CA (US); Abhijeet Ghosh, London (GB); Graham Fyffe, Los Angeles, CA (US)

(73) Assignee: UNIVERSITY OF SOUTHERN CALIFORNIA, Los Angeles, CA (US)

( * ) Notice: Subject to any disclaimer, the term of this patent is extended or adjusted under 35 U.S.C. 154(b) by 635 days.

(21) Appl. No.: 13/449,729

(22) Filed: Apr. 18, 2012

(65) Prior Publication Data

US 2012/0268571 A1    Oct. 25, 2012

Related U.S. Application Data

(60) Provisional application No. 61/477,102, filed on Apr. 19, 2011.

(51) Int. Cl.
| | | |
|---|---|---|
| *G06T 7/00* | (2006.01) | |
| *H04N 13/02* | (2006.01) | |
| *G06K 9/00* | (2006.01) | |
| *G06K 9/20* | (2006.01) | |

(52) U.S. Cl.
CPC .......... *G06T 7/0073* (2013.01); *G06K 9/00255* (2013.01); *G06K 9/2036* (2013.01); *H04N 13/0253* (2013.01); *H04N 13/0282* (2013.01); *G06T 2207/10016* (2013.01); *G06T 2207/10152* (2013.01); *G06T 2207/30201* (2013.01)

(58) Field of Classification Search
CPC .................................................... G06T 7/0073
USPC ............................................................ 348/48
See application file for complete search history.

(56) References Cited

U.S. PATENT DOCUMENTS

| | | | |
|---|---|---|---|
| 6,685,326 | B2 | 2/2004 | Debevec et al. |
| 6,919,962 | B2 | 7/2005 | Debevec et al. |
| 7,044,613 | B2 | 5/2006 | Debevec et al. |
| 7,436,403 | B2 | 10/2008 | Debevec et al. |
| 7,529,004 | B2 | 5/2009 | Debevec et al. |

(Continued)

OTHER PUBLICATIONS

Ma, Wan-Chun, et al. "A system for high-resolution face scanning based on polarized spherical illumination." SIGGRAPH. vol. 7.*

(Continued)

*Primary Examiner* — Dave Czekaj
*Assistant Examiner* — Berteau Joisil
(74) *Attorney, Agent, or Firm* — McDermott Will & Emery LLP

(57) ABSTRACT

A multiview face capture system may acquire detailed facial geometry with high resolution diffuse and specular photometric information from multiple viewpoints. A lighting system may illuminate a face with polarized light from multiple directions. The light may be polarized substantially parallel to a reference axis during a parallel polarization mode of operation and substantially perpendicular to the reference axis during a perpendicular polarization mode of operation. Multiple cameras may each capture an image of the face along a materially different optical axis and have a linear polarizer configured to polarize light traveling along its optical axis in a direction that is substantially parallel to the reference axis. A controller may cause each of the cameras to capture an image of the face while the lighting system is in the parallel polarization mode of operation and again while the lighting system is in the perpendicular polarization mode of operation.

20 Claims, 9 Drawing Sheets

(56) References Cited

U.S. PATENT DOCUMENTS

| | | | |
|---|---|---|---|
| 2008/0297593 A1 | 12/2008 | Debevec et al. | |
| 2008/0304081 A1 | 12/2008 | Debevec et al. | |
| 2009/0080036 A1* | 3/2009 | Paterson et al. | 358/474 |
| 2009/0195545 A1 | 8/2009 | Debevec et al. | |
| 2009/0226049 A1 | 9/2009 | Debevec et al. | |
| 2010/0328677 A1 | 12/2010 | Debevec et al. | |
| 2011/0102553 A1* | 5/2011 | Corcoran et al. | 348/50 |
| 2012/0050606 A1 | 3/2012 | Debevec et al. | |

OTHER PUBLICATIONS

Beeler, T. et al. 2010. High-quality single-shot capture of facial geometry. ACM Trans. Graph. Jul. 29, 40:1-40:9.

Bradley, D. et al. 2010. High resolution passive facial performance capture. ACM Trans. Graph. Jul. 29, 41:1-41:10.

Debevec P. et al. 2002. A Lighting Reproduction Approach to Live-Action Compositing. In ACM SIGGRAPH 2002, Computer Graphics Proceedings, Annual Conference Series, Jul. 21-26, 2002, 10 pages.

Fyffe, G. et al. 2011. Comprehensive Facial Performance Capture. Computer Graphics Forum (Proc. Eurographics), vol. 30, No. 2, pp. 425-434.

Ghosh, A. et al. 2010. Circularly polarized spherical illumination reflectometry. ACM Trans. Graph. Dec. 29, 162:1-162:12.

Hawkins, T. et al. 2004. Animatable Facial Reflectance Fields. In Rendering Techniques 2004: 15th Eurographics Symposium on Rendering, The Eurographics Association, pp. 309-320.

Ma, W.-C. et al. 2007. Rapid acquisition of specular and diffuse normal maps from polarized spherical gradient illumination. In Rendering Techniques, 183-194.

Nehab, D. et al. 2005. Efficiently combining positions and normals for precise 3D geometry. ACM TOG 24, 3, 536-543.

Peers, P. et al. 2007. Post-Production Facial Performance Relighting Using Reflectance Transfer. Proceedings, ACM Transactions on Graphics, Jul. 2007, vol. 26, No. 3, Article 52, pp. 52-1 to 52-10.

Wenger, A. et al. 2005. Performance Relighting and Reflectance Transformation with Tim-Multiplexed Illumination. SIGGRAPH 2005, 9 pages.

Wilson, C. A. et al. 2010. Temporal upsampling of performance geometry using photometric alignment. ACM Trans. Graph. Apr. 29, 17:1-17:11.

Zhang, Z. 2000. A flexible new technique for camera calibration. PAMI 22, 11, 1330-1334.

* cited by examiner

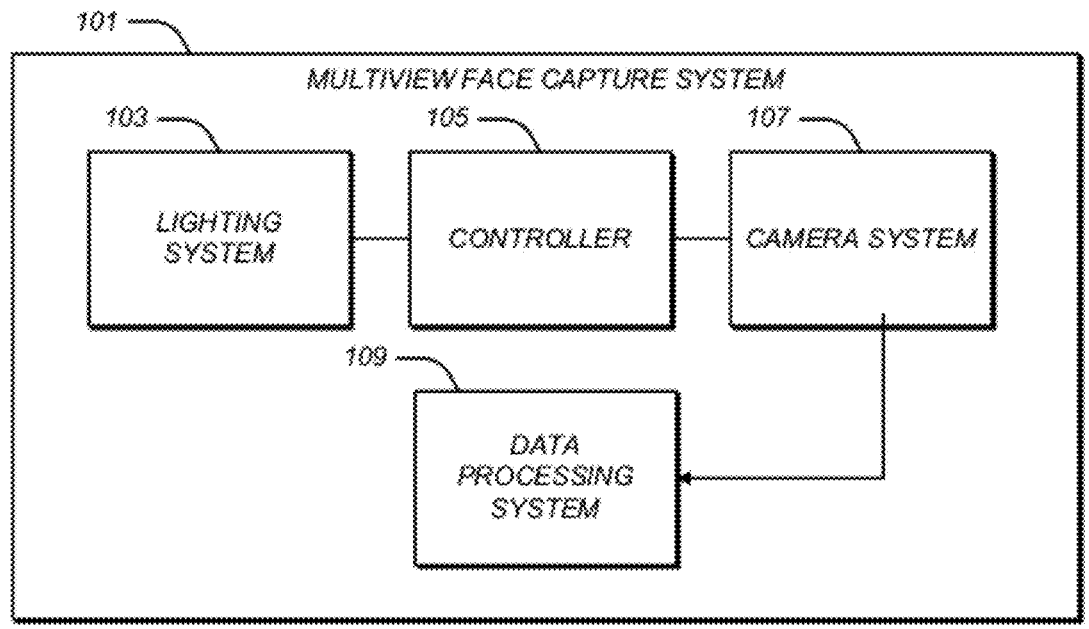
FIG. 1
FIG. 2A
FIG. 2B
FIG. 2C (a) Ma et al.  (b) Our method (a) Fyffe et al.  (b) TRW-SAD  (c) Our method
                 (heuristic separation)  (polarized separation)

MULTIVIEW FACE CAPTURE USING POLARIZED SPHERICAL GRADIENT ILLUMINATION

CROSS-REFERENCE TO RELATED APPLICATION

This application is based upon and claims priority to U.S. provisional patent application 61/477,102, entitled "MULTIVIEW FACE CAPTURE USING POLARIZED SPHERICAL GRADIENT ILLUMINATION," filed Apr. 19, 2011. The entire content of this application is incorporated herein by reference.

STATEMENT REGARDING FEDERALLY SPONSORED RESEARCH

This invention was made with government support under Grant No. W911 NF-04-D-0005, awarded by the Army Research Office (ARO). The government has certain rights in the invention.

BACKGROUND

1. Technical Field

This disclosure relates to acquiring detailed facial geometry with high resolution diffuse and specular photometric information from multiple viewpoints.

2. Description of Related Art

Digitally reproducing the shape and appearance of real-world subjects has been a long-standing goal of computer graphics. In particular, the realistic reproduction of human faces has received increasing attention in recent years. Some of the best techniques use a combination of 3D scanning and photography under different lighting conditions to acquire models of a subject's shape and reflectance. When both of these characteristics are measured, the models can be used to faithfully render how the object would look from any viewpoint, reflecting the light of any environment. An ideal process would accurately model the subject's shape and reflectance with just a few photographs. However, in practice, significant compromises are typically made between the accuracy of the geometry and reflectance model and the amount of data which must be acquired.

Polarized spherical gradient illumination has been used for acquiring diffuse and specular photometric information and using it in conjunction with structured light scanning to obtain high resolution scans of faces. In addition to the detail in the reconstructed 3D geometry, photometric data acquired with this technique can be used for realistic rendering in either real-time or offline contexts. However, the technique may have significant limitations. The linear polarization pattern may be effective only for a frontal camera viewpoint, forcing the subject to be moved to different positions to scan more than the front of the face. Also, the lighting patterns may require rapidly flipping a polarizer in front of the camera using custom hardware in order to observe both cross-polarization and parallel-polarization states. The reliance on structured light for base geometry acquisition may add scanning time and system complexity, while further restricting the process to single-viewpoint scanning.

To overcome viewpoint restriction imposed by active illumination, advanced multiview stereo (MVS) may be used to derive geometry from several high-resolution cameras under diffuse illumination. While the geometric detail derived may not be at the level of skin mesostructure, additional detail may be inferred through a "dark-is-deep" interpretation of the diffuse shading, producing geometric detail correlating to skin pores and creases. Just a single set of simultaneous photographs may suffice as input, allowing even ephemeral poses to be recorded. However, the techniques may be limited in that they record only a diffuse texture map to generate renderings rather than separated reflectance components, and the geometric detail inferable from diffuse shading can vary significantly from the true surface detail which is more directly evidenced in specular reflections. Also, the single-shot nature of these techniques may not be required for acquiring most facial expressions, as subjects can typically maintain the standard facial expressions used in building facial animation rigs for the handful of seconds required for multi-shot techniques.

While there has been a wide body of work on 3D scanning of objects, scanning of human faces can present specific challenges in obtaining high-quality geometry and reflectance information. There are high resolution techniques for scanning static facial expressions based on laser scanning a plaster cast, such as the scans performed by XYZRGB, Inc. However, such techniques may not be well suited for scanning faces in non-neutral expressions and may not capture reflectance maps.

Real-time 3D scanning systems exist that are able to capture dynamic facial performances. These methods may rely on structured light; unstructured painted face texture, or use photometric stereo. However, these methods may be limited: they may not provide sufficient resolution to model facial details, they may assume uniform albedo, or they may be data-intensive. An alternate approach is to first acquire a detailed static scan of the face including reflectance data, augmenting it with traditional marker-based facial motion-capture data for large scale deformation, and integrate high resolution video data for medium scale expressive wrinkles.

There are also passive multiview face scanning systems which exploit detail in the observed skin texture under diffuse illumination in order to reconstruct high resolution face scans. While achieving impressive qualitative results for geometry reconstruction, these techniques may rely on synthesis of mesoscopic detail from skin texture that may differ from true surface detail. Furthermore, these techniques may not capture specular reflectance maps which may be useful for realistic rendering.

At the other end of the spectrum, dense lighting and viewpoint measurements have been employed to capture detailed spatially varying facial reflectance. However, such techniques may be data intensive and may not scale well for scanning of non-neutral facial expressions and dynamic facial performances.

There is also a technique for high resolution face scanning of static expressions based on photometric surface normals computed from spherical gradient illumination patterns. They may capture separate photometric albedo and normal maps for specular (surface) and diffuse (subsurface) reflection by employing polarization of incident lighting. Photometric normals—in particular the detailed specular normals—may be used to add fine-scale detail to base geometry obtained from structured light. However, a linear polarization pattern may limit the acquisition to a single viewpoint providing limited coverage of the scanned subject.

Other work has extended the technique for capture of dynamic facial performance using high speed photography, as well as moderate acquisition rates using joint photometric alignment of complementary gradients. This technique has been applied to acquiring facial performance from multiple viewpoints. However, the technique may be limited to acquiring unpolarized data for viewpoint independence and employing heuristic post-processing for diffuse-specular separation.

View independent separation of diffuse and specular reflectance may be used by measuring the Stokes parameters of circularly polarized spherical illumination. However, this technique may require four measurements per spherical lighting condition with a set of different linear and circular polarizers in front of the camera in order to compute the Stokes parameters and hence may not scale well for multiview acquisition of live subjects.

SUMMARY

A multiview face capture system may acquire detailed facial geometry with high resolution diffuse and specular photometric information from multiple viewpoints.

A lighting system may illuminate a face from multiple directions with polarized light. The light may be polarized substantially parallel to a reference axis during a parallel polarization mode of operation. The light may be polarized substantially perpendicular to the reference axis during a perpendicular polarization mode of operation.

A camera system may include one or more cameras. Each camera may be configured to capture an image of the face along a materially different optical axis. Each camera may have a linear polarizer configured to polarize light traveling along its optical axis in a direction that is substantially parallel to the reference axis.

A controller may control the lighting system and/or the camera system so as to cause each of the cameras to capture an image of the face while the lighting system is in the parallel polarization mode of operation and again while the lighting system is in the perpendicular polarization mode of operation.

During a spherical mode of operation, the lighting system may cause the illumination of the face during both polarization modes of operation to be substantially spherical. The controller may control the lighting system and/or the camera system so as to cause each of the cameras to capture an image of the face during the spherical mode of operation while the lighting system is in the parallel polarization mode of operation and again while the lighting system is in the perpendicular polarization mode of operation.

During a first, second, and third gradient mode of operation, the lighting system may cause the intensity of the illumination of the face to vary in a gradient across a first, second, and third directional axis, respectively, during both polarization modes of operation. The second directional axis may be perpendicular to the first directional axis, and the third directional axis may be perpendicular to the first and the second directional axes. The controller may control the lighting system and/or the camera system so as to cause each of the cameras to capture an image of the face during the first, second, and third gradient modes of operation while the lighting system is in the parallel polarization mode of operation and again while the lighting system is in the perpendicular polarization mode of operation.

Each optical axis may be substantially perpendicular to the reference axis. Each optical axis may pass through the approximate vertical center of the face.

3D geometry of the face may be generated based at least in part on a specular surface normal map of the face from multiple viewpoints. The 3D geometry of the face may also be based on a specular albedo map of the face from multiple viewpoints and/or a diffuse albedo map of the face from multiple viewpoints.

A cylindrical displacement map X may be computed that minimizes substantially the following graphical cost function:

$$E(X) = \sum_{s \in V} \phi_s(x_s) + \sum_{(s,t) \in E} \psi_{st}(x_s, x_t)$$

where $\mathcal{V}$ is a set of all pixel sites in the displacement map X, $\mathcal{E}$ is a set of edges connecting neighboring sites, $x_s$ is a displacement distance from cylinder axis at site s, $\phi_S$, is a data term, and $\Psi_{ST}$ is a smoothing term.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

FIG. 1 illustrates an example of a multiview face capture system.

FIGS. 2A-C illustrate diffuse (FIG. 2A), specular albedo (FIG. 2B), and normal (FIG. 2C) maps that may be obtained from multiview face capture using polarized spherical gradient illumination from viewpoints.

FIG. 5C illustrates a view through a horizontal linear polarizer.

DETAILED DESCRIPTION OF ILLUSTRATIVE EMBODIMENTS

Figures 3A, 3B:
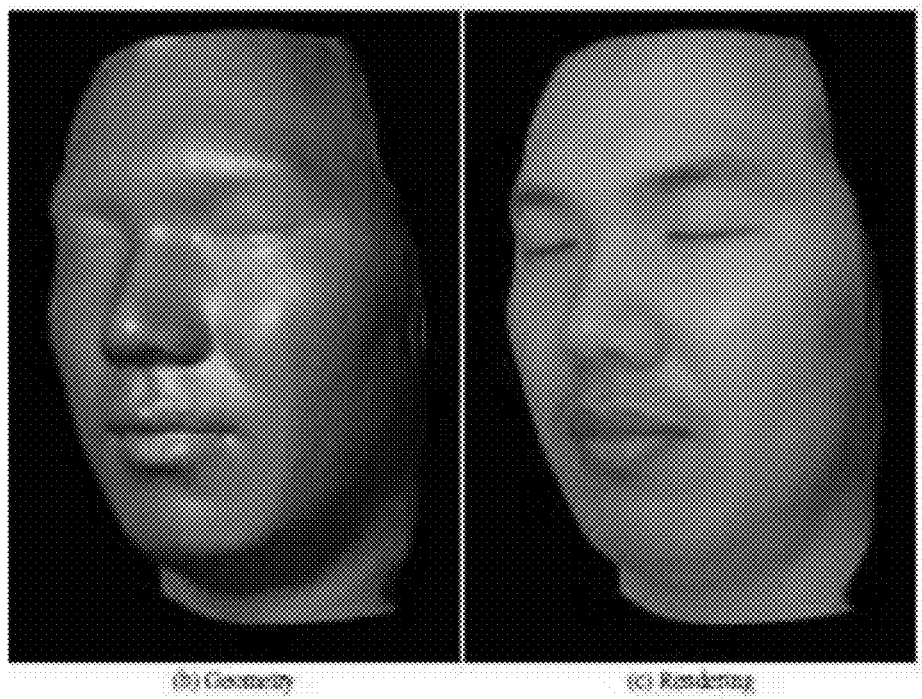
FIG. 3A presents result of detailed geometry reconstruction that may be obtained from multiview face capture using polarized spherical gradient illumination from viewpoints.
FIG. 3B presents rendering with acquired hybrid normals that may be obtained from multiview face capture using polarized spherical gradient illumination from viewpoints.

Illustrative embodiments are now described. Other embodiments may be used in addition or instead. Details that may be apparent or unnecessary may be omitted to save space or for a more effective presentation. Some embodiments may be practiced with additional components or steps and/or without all of the components or steps that are described.

FIG. 1 illustrates an example of a multiview face capture system 101. The multi-view face capture system 101 may include a lighting system 103, a camera system 105, a controller 107, and a data processing system 109.

The lighting system 103 may be of any type. For example, the lighting system may be configured to illuminate a face from multiple directions with polarized light. The polarized light may be polarized substantially parallel to a reference axis during a parallel polarization mode of operation. The reference axis may be vertical, horizontal extending from front to back, horizontal extending from side to side, or in any other orientation. The polarized light may in addition or instead be polarized substantially perpendicular to the reference access during a perpendicular polarization mode of operation. To effectuate this polarization, any type of linear polarizer may be used.

The lighting system 103 may include a light source that generates the illumination from each of the multiple directions that is physically separate from the light source that generates the illumination from each of the other multiple directions. The physically separate light source may be of any type, such as one or more LEDs, or any type of lighting fixture. The lighting system 103 may in addition or instead include a flat panel containing separately-controllable pixels, such as an LCD and/or a DLP panel, or a light box.

The lighting system 103 may be configured to cause, during a spherical mode of operation, the illumination of the face during both polarization modes of operation to be substantially spherical. For example, the lighting system 103 may consist of a large number of LEDs arranged in the shape of a large sphere. The face may be positioned at the approximate center of this sphere.

The lighting system 103 may be configured to cause, during a gradient mode of operation, the intensity of the illumination of the face to vary in a gradient across a directional axis during both polarization modes of operation. For example, the lighting system 103 may be configured to cause the intensity to vary across a vertical directional axis during a first gradient mode of operation, a horizontal directional axis extending from front to back during a second gradient mode of operation, and/or a horizontal directional axis extending from side to side during a third gradient mode of operation.

The camera system 105 may be of any type. For example, the camera system may include one or more cameras. Each camera may be configured to capture an image of the face along a materially different optical axis. Each optical axis may be substantially perpendicular to the reference access. Each optical axis may pass through the approximate vertical center of the face.

Each camera may have a linear polarizer configured to polarize light traveling along its optical axis in a direction that is substantially parallel to the reference axis, such as in a vertical direction or a horizontal direction.

The controller 107 may be configured to cause each of the one or more cameras in the camera system 105 to capture an image of the face while the lighting system is in the parallel polarization mode of operation and, again, while the lighting system is in the perpendicular polarization mode of operation. The controller may be configured to control the lighting system 103 and/or the camera system 105 so as to cause these captures to take place during the spherical mode of operation and/or during one, two, or all of the gradient modes of operation, or any combination of these modes of operation.

The controller 107 may be configured to effectuate these synchronous operations in any way. For example, the controller 107 may be configured to receive a synchronization signal from the camera system 105 each time a frame is about to be captured and may use this synchronization signal to cause the lighting system to step through various programmed modes of its operation. Conversely, the controller 107 may be configured to receive a synchronization signal from the lighting system 103 each time it steps through one of its programmed modes of operation and may use this synchronization signal to cause the camera system 105 to capture a new frame each time. In a still further embodiment, the controller 107 may itself generate synchronization signals that are, in turn, used by both the lighting system 103 and the camera system 105 to effectuate, respectively, mode changes on behalf of the lighting system 103 and frame captures by the camera system 105. Although illustrated as separate from the lighting system 103 and the camera system 105, all or portions of the controller 107 may be part of the lighting system 103 and/or the camera system 105.

The data processing system 109 may be a general-purpose computer or a special purpose computer program with software that is configured with appropriate algorithms to generate data representative of 3G geometry of the face based on signals from the camera system 107. For example, the data processing system 109 may be configured to extract a specular surface normal map, a specular albedo map, and/or a diffuse albedo map of the face, each from multiple viewpoints, based on the signals from the camera system 107. The data processing system 109 may be configured to generate this 3-D geometry based on one or more of these maps, such as based on the specular surface normal map, with or without the specular albedo map and/or the diffuse albedo map.

The data processing system 109 may be configured to compute a cylindrical displacement map X that minimizes substantially the following graphical cost function:

$$E(X) = \sum_{s \in V} \phi_s(x_s) + \sum_{(s,t) \in E} \psi_{st}(x_s, x_t)$$

where V is a set of all pixel sites in the displacement map X, E is a set of edges connecting neighboring sites, $x_s$ is a displacement distance from cylinder axis at site s, $\phi_S$ is a data term, and $\Psi_{ST}$ is a smoothing term.

The components that have been described may be used to acquire detailed facial geometry with high resolution diffuse and specular photometric information from multiple viewpoints using polarized spherical gradient illumination. The described pair of linearly polarized lighting patterns may enable multiview diffuse-specular separation under a given spherical illumination condition from just two photographs. The patterns—one that may follow lines of latitude and one that may follow lines of longitude—may allow the use of fixed linear polarizers in front of the cameras, enabling more efficient acquisition of diffuse and specular albedo and normal maps from multiple viewpoints.

These albedo and normal maps may serve as input to a multi-resolution adaptive domain message passing stereo reconstruction algorithm to create high resolution facial geometry. To do this, the stereo reconstruction may be formulated from multiple cameras in a commonly parameterized domain for multiview reconstruction. The results may include high-resolution facial geometry with relightable reflectance maps using five DSLR cameras as part of the camera system 107. The technique may scale well for multiview acquisition without requiring specialized camera systems for sensing multiple polarization states.

The approach may generalize polarized spherical gradient illumination techniques to multiview acquisition and yield high quality facial scans including diffuse and specular reflectance albedo and normal maps. The pair of linearly polarized spherical illumination patterns may enable camera placement anywhere near the equator of a subject, while providing high quality diffuse-specular separation. Additionally, the technique may only require fixed static polarizers on the cameras, enabling the technique to scale well for multiview acquisition. Both the diffuse and specular photometric data may be leveraged in a multi-resolution adaptive-domain message passing stereo algorithm to reconstruct high resolution facial scans. The proposed technique may successfully use data simultaneously acquired from five viewpoints.

This polarized spherical gradient illumination technique may enable multiview face scanning; a multiview acquisition may employ low-cost, static polarizers on both the cameras and light sources; and a multi-resolution adaptive domain message passing stereo reconstruction algorithm may use diffuse and specular albedo and normal maps for high quality facial geometry reconstruction.

The various components and approaches that have been discussed may be implemented in various ways and in conjunction with other components and approaches. Examples of these, as well as results of various tests of them that have been run, are now described.

Multiview Acquisition—Polarization Pattern

Figure 4:
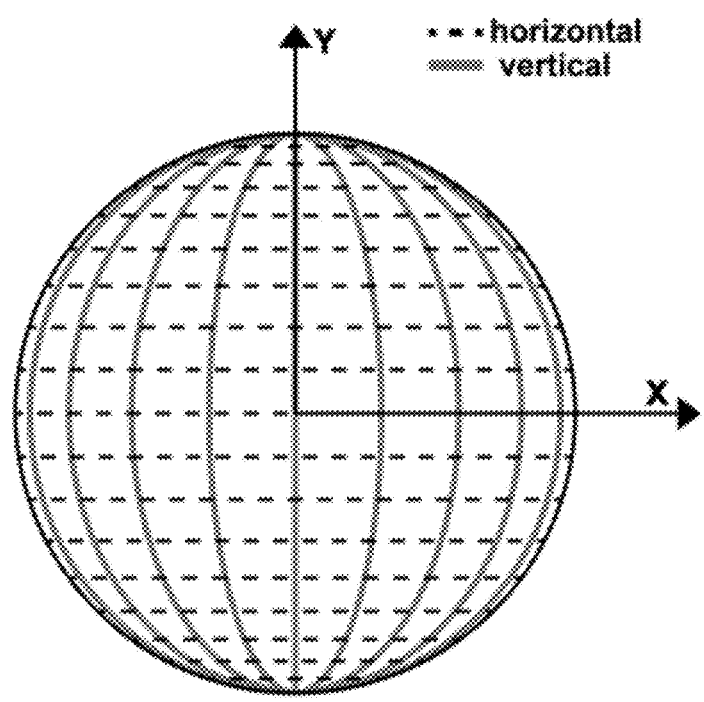
FIG. 4 illustrates lines of latitude-longitude (lat-long) linear polarization pasterns for multiview acquisition that may be alternatingly generated by the lighting system illustrated in FIG. 1.

FIG. 4 illustrates lines of latitude-longitude (lat-long) linear polarization patterns for multiview acquisition that may be alternatingly generated by the lighting system 103. A pair of lat-long polarized lighting patterns may allow multiview diffuse-specular separation under spherical illumination in just two photographs. The patterns may be linearly polarized and locally orthogonal on a sphere, one following the horizontal lines of latitude (FIG. 4, red) and one following vertical lines of longitude (FIG. 4, blue). Each may be symmetric about the up and down Y-axis. This symmetry may allow measurement from any viewpoint around the equator of the sphere near the XZ plane.

The usefulness of these multiview patterns may be restricted to viewpoints near the equator, making them less useful for capturing a subject from above or below. The diffuse-specular separation achieved by the lat-long patterns may be slightly degraded compared to an optimal (but view-dependent) pattern in MA, W.-C., HAWKINS, T., PEERS, P., CHABERT, C.-F., WEISS, M., AND DEBEVEC, P. 2007. Rapid acquisition of specular and diffuse normal maps from polarized spherical gradient illumination. In Rendering Techniques, 183-194 (hereinafter "Ma et al. 2007" or "Ma et al.") Nonetheless, the lat-long patterns may very effectively record the most important range of viewpoints and surface orientations for multiview capture.

Figures 5A, 5B, 5C:
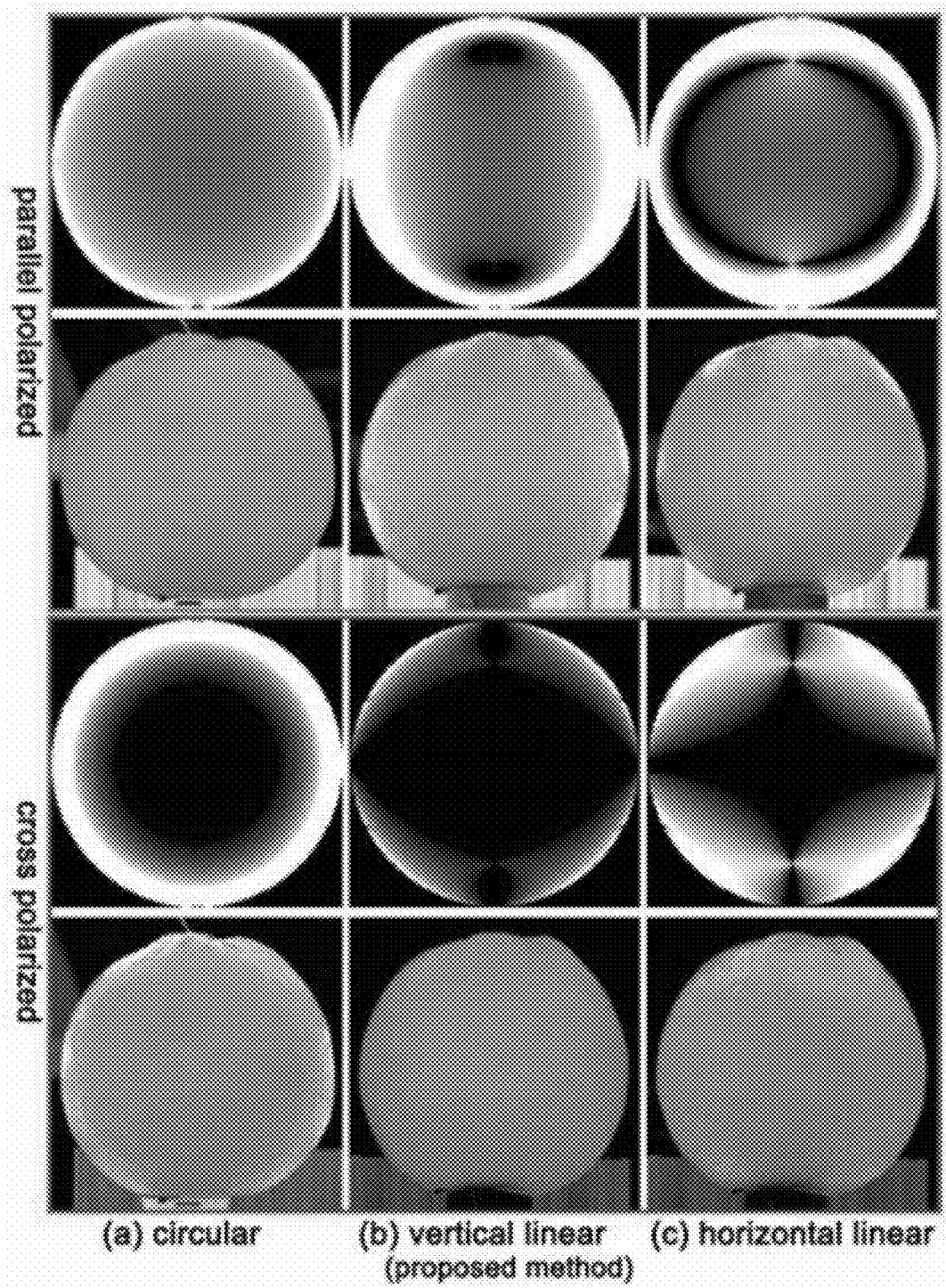
FIGS. 5A-C compare a symmetric view-independent measurement obtained with circular polarization (FIG. 5A) to that obtained with the proposed lat-long multiview polarization solution (FIG. 5B).

FIGS. 5A-5C illustrate polarization-based multiview diffuse-specular separation. Rows one and three use simulated polarized reflectance on a specular sphere. Rows two and four use measured data of a plastic orange. The top two rows use parallel polarization state with diffuse plus specular. The bottom two rows use cross polarization state with specular cancellation. FIG. 5A uses circular polarization; FIG. 5B uses proposed lines of lat-long linear polarization patterns with a vertical linear polarizer in front of the camera; and FIG. 5C uses lines of lat-long linear polarization patterns with a horizontal linear polarizer in front of the camera. Although the circular polarization separation is symmetric over the entire sphere in FIG. 5A, the proposed linear lines of lat-long provides a cleaner separation of reflected directions for a camera placed around the equator in FIG. 5B. However, the linear lines of lat-long may only be symmetric about the Y-axis and hence rotating the linear polarizer in front of the camera to a horizontal polarization has a different result with poor diffuse-specular separation in FIG. 5C.

FIGS. 5A-C compare a symmetric view-independent measurement obtained with circular polarization (FIG. 5A) to that obtained with the proposed lat-long multiview polarization solution (FIG. 5B). To better understand the comparison, simulated results are shown for a perfectly specular sphere as well as real measurements of a plastic orange for both parallel-polarized (top) and cross-polarized (bottom) states. The simulations were generated according to Mueller calculus of polarized specular reflection GHOSH, A., CHEN, T., PEERS, P., WILSON, C. A., AND DEBEVEC, P. 2010. Circularly polarized spherical illumination reflectometry. *ACM Trans. Graph.* 29 (December), 162:1-162:12 (hereinafter "Ghosh et al. 2010") and employ a microfacet BRDF model that includes Fresnel reflectance.

As can be seen, the cross-polarized state of circular polarization results in specular cancellation in the center of the sphere, but strong specular reflections due to the opposite chirality of the reflected circularly polarized light beyond the Brewster angle. As such, Gosh et al.'s technique may require four photographs (to measure complete Stokes parameters) for proper diffuse-specular separation under circularly polarized spherical lighting. In comparison, the lat-long linear polarization patterns described above, viewed with a fixed vertical linear polarizer on the camera (FIG. 5B), may result in high-quality diffuse-specular separation in just two photographs. Placing the cameras' polarizers vertically may be important: since the lat-long patterns are symmetric only about the Y-axis, viewing them through a horizontal linear polarizer may yield poor diffuse-specular separation (FIG. 5C).

Since both patterns are symmetric about the Y-axis, the multiview diffuse-specular separation may be achievable when employing only one of these patterns. Using just one pattern, approximately cross- and parallel-polarized states may be obtained by flipping a linear polarizer in front of the camera as in Ma et al. 2007. If just the longitudinal pattern is employed, the parallel polarization state of FIG. 5B may be obtained with good specular signal over most of the sphere. However, when the polarizer is flipped on the camera to horizontal, the cross polarized state of FIG. 5C may be obtained with poor specular cancellation. Conversely, if just the latitudinal pattern is employed, then good specular cancellation may be obtained with a vertical polarizer on the camera (the cross-polarized state of FIG. 5B). However, flipping the polarizer on the camera to horizontal may show a loss of specular signal close to the Brewster angle as seen in the parallel-polarized state of FIG. 5C. Instead, when both the longitudinal and latitudinal patterns (with fixed vertical polarizers on the cameras) are employed, the best specular cancellation may be obtained in the cross-polarized state and the strongest specular signal in the parallel-polarized state (FIG. 5B). The proposed lat-long polarization patterns may have two implementation advantages as well. The first may be that they require only a static (vertical) linear polarizer on each camera to observe both cross-polarized and parallel-polarized states. Secondly, the regular grid structure of the polarization patterns may make it much simpler to mount polarizers on the lights without tuning polarizer orientations to cancel the reflections of a calibration object.

Multiview Acquisition—Setup and Acquisition

A setup for multiview face scanning may include an LED sphere with, for example, 156 individually controllable lights that allow a subject to be illuminated with spherical illumination including 1st-order gradient patterns of Ma et al. 2007 for obtaining surface normal estimates.

Figure 6:
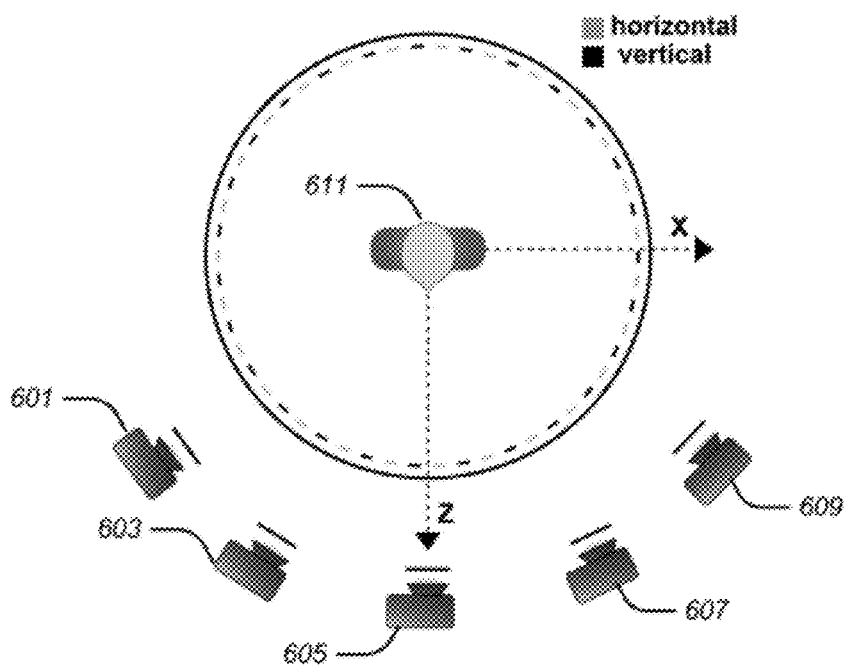
FIG. 6 illustrates an example of an acquisition setup for multiview face scanning.

FIG. 6 illustrates an example of an acquisition setup for multiview face scanning. Five Canon 1D Mark III digital SLRs cameras 601, 603, 605, 607, and 609 may be used operating in "burst" mode to rapidly acquire polarized gradient illumination data from multiple viewpoints. Fixed vertical linear polarizers may be placed on the camera lenses. A subject 611 may be illuminated with spherical gradient illumination, switching between the latitudinal and longitudinal patterns, using the LED sphere. To realize both patterns on one LED sphere, the LED lights may be partitioned into two interleaved banks, one with vertical linear polarizers and one with horizontal. Advantage may be taken of the low frequency nature of the spherical gradient illumination as the reflected light towards the camera integrates over the gradients covered by the diffuse and specular lobes of the surface BRDF. With this measurement setup, a subject may be rapidly captured under complementary spherical gradient illumination conditions of WILSON, C. A., GHOSH, A., PEERS, P., CHIANG, J.-Y., BUSCH, J., AND DEBEVEC, P. 2010. Temporal upsampling of performance geometry using photometric alignment. *ACM Trans. Graph.* 29 (April), 17:1-17:11 (hereinafter "Wilson et al. 2010") which may be relatively robust to subject motion. The cameras may record the complementary gradients in two polarization states in slightly over three seconds.

FIGS. 2A-C illustrate diffuse (FIG. 2A) and specular albedo (FIG. 2B) and normal (FIG. 2C) maps that may be obtained from these measurements from multiple viewpoints.

FIGS. 7A-7D provide a diffuse-specular separation comparison on a face. The top row illustrates view-dependent separation using the linear polarization pattern of Ma et al. 2007. The center row illustrates multiview separation using circular polarization. Note the specular pollution in diffuse and poor specular signal-to-noise ratio close to the Brewster angle at the sides of the face. The bottom row illustrates multiview separation using the proposed linear lat-long polarization patterns. Note the clean separation and good specular signal-to-noise ratio over the entire face.

FIGS. 7A-7D compare the quality of data acquired with the lat-long polarization patterns in this setup with those obtained with the view-dependent polarization pattern of Ma et al. 2007 and its alternative circular polarization approach. As can be seen, circular polarization may suffer from specular pollution in the diffuse albedo and poor signal strength in the specular reflection around the sides of the face corresponding to Brewster angle (center-row). In contrast, the lat-long polarization patterns may result in diffuse and specular albedo and normal maps comparable in quality to those obtained by the view-dependent linear polarization pattern of Ma et al. 2007, with the added advantage of multiview acquisition.

Achieving Photometric Consistency Across Viewpoint

Figures 8A, 8B:
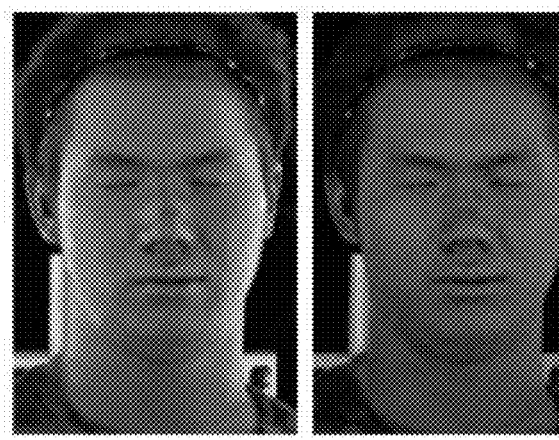
FIGS. 8A-8C illustrate data-driven Fresnel compensation from specular albedo.
Figure 8C:
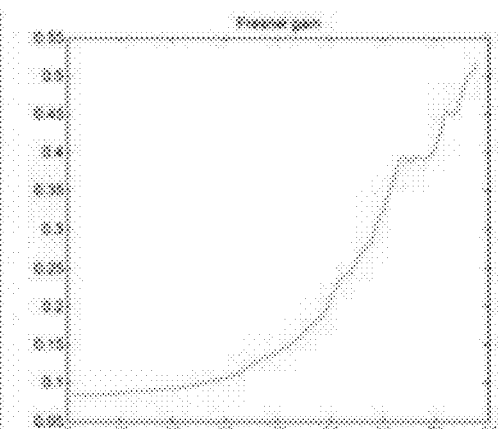
Figures 7A, 7B, 7C, 7D:
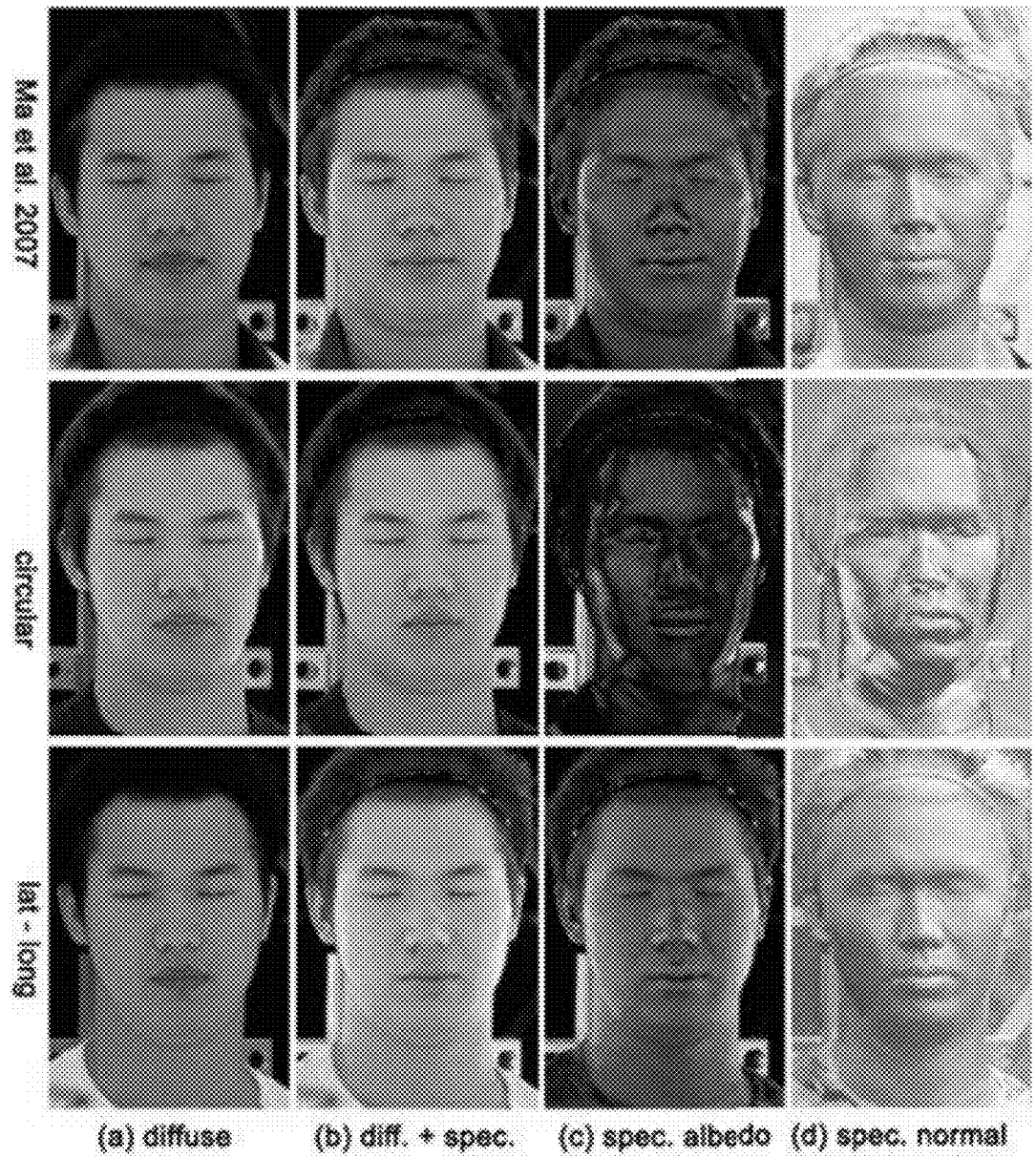
FIGS. 7A-7D illustrate a diffuse-specular separation comparison on a face.

FIGS. 8A-8C illustrate data-driven Fresnel compensation from specular albedo. FIG. 8A illustrates a captured specular albedo map. FIG. 8B illustrates a specular albedo map after factoring out the measured Fresnel gain. FIG. 8C illustrates measured, view-dependent Fresnel gain (as a function of N·V) in specular albedo map used for Fresnel compensation.

The diffuse and specular albedo and specular normals acquired in this manner from multiple viewpoints were thereafter used as input to a stereo reconstruction algorithm (described below). The diffuse albedo map was view-independent and hence a suitable input to stereo matching. The specular normal maps in world coordinates were computed to make them suitable for stereo as well. Finally, the specular albedo maps exhibited view-dependent Fresnel gain toward grazing angles, as illustrated in FIG. 8A. The Fresnel gain was compensated to make the specular albedo maps less view-dependent and more suitable for stereo. This was done using a data-driven procedure as follows: a 1D curve of the observed Fresnel gain was first built from a single viewpoint by averaging the observed intensities over the face as a function of the angle θ between the estimated specular normal N at a surface point and the camera view direction V (FIG. 8C). In a second step, this 1D curve was employed to scale the observed intensity at a surface point with a known surface orientation to that observed at θ=0 in order to obtain a view-independent specular albedo map (FIG. 8B). The same 1D Frensel curve was applied, built from data from a single viewpoint, to specular albedo maps captured from all camera viewpoints to obtain Fresnel-compensated albedo maps for stereo matching (FIG. 2). Fresnel reflectance depends in principle on the index of refraction of the surface (skin).

Geometry Reconstruction

The multiview geometry reconstruction algorithm takes the acquired diffuse and specular albedo and normal maps from each of the cameras and derives a high resolution face mesh. The cameras were calibrated using the technique of ZHANG, Z. 2000. A flexible new technique for camera calibration. *PAMI* 22, 11, 1330-1334 (hereinafter "Zhang 2000") in a common coordinate system for stereo reconstruction.

Geometry Reconstruction—Stereo Reconstruction

Stereo reconstruction methods typically compute a depth map defined in the image spaces of the cameras used for acquisition. In multiview acquisition setups, this is usually followed by merging multiple depth maps into a single mesh. Further refinement may then be performed using the merged mesh as a base. An approach was instead taken that requires no merging, and no separate refinement step. Similar to Fyffe et al. 2011, facial geometry was represented using a cylinder as a base surface plus a displacement map, where the displacement vectors point away from the cylinder axis. However, a single mesh was computed directly in the cylindrical parameterization domain, which eliminated the need for merging multiple depth maps. The cylindrical displacement map X may be computed to minimize the following graphical cost function:

$$E(X) = \sum_{s \in V} \phi_s(x_s) + \sum_{(s,t) \in E} \psi_{st}(x_s, x_t).$$

where V is the set of all pixel sites in the displacement map, E is the set of edges connecting neighboring sites, xs is the displacement (distance from cylinder axis) at site s, and $\phi_S$, $\Psi_{ST}$ are the data term and smoothing term, respectively (detailed in the paragraphs following). The measured diffuse albedo map (3-channels), the (Fresnel corrected) specular albedo map (1-channel), and the photometric (specular) surface normal (3-channels) were employed in the data term, while also employing the photometric normal in the smoothing term. These terms also make use of a visibility estimate.

Data Term

The data term was a weighted average of normalized cross correlation costs (NCC) over all pairs of neighboring cameras i, j. (1−NCC)/2 was used as the cost BEELER, T., BICKEL, B., BEARDSLEY, P., SUMNER, B., AND GROSS, M. 2010. High-quality single-shot capture of facial geometry. ACM Trans. Graph. 29 (July), 40:1-40:9 (hereinafter "Beeler et al. 2010") over a 3×3-sample window centered at the point p corresponding to the cylinder coordinate (s, $x_s$). A photometric surface normal was estimated as a weighted blend of the normals seen by each camera: $n_{ij}=(w_i n_i+w_j n_j)/|w_i n_i+w_j n_j|$, where $n_i$ was the photometric normal seen at p in camera i, $v_i$ is the view vector directed towards camera i, and $w_i=(n_i \cdot v_i)$ if p was visible to camera i (determined by the current visibility estimate) and 0 otherwise. The sample window in 3D was constrained to be perpendicular to $n_{ij}$ (and as upright as possible), yielding samples that were roughly tangent to the surface. To avoid aliasing due to differences in foreshortening, the sample spacing was adjusted on a per-camera-pair basis such that the projected samples were separated by roughly one pixel on both cameras in the pair. The NCC cost was summed over all data channels c in diffuse albedo, specular albedo, and specular normal. This provided increased localization compared to other works that use only surface color. The overall weight for the pair of cameras $w_{ij}=(w_i w_j (n_i \cdot n_j))^2$. The final data term was:

$$\phi_s(x_s) = \frac{\sum_{ij} w_{ij} \sum_c (1 - NCC_{ij;c}(p))/2}{\sum_{ij} w_{ij}}.$$

Smoothing Term

First-order smoothing terms in stereo reconstruction may favor piecewise-constant depth maps, since only constant depth surfaces are admitted without penalty. Second-order smoothing terms may allow for smoother geometry estimates since they admit any planar surface without penalty, but may be more difficult to optimize. Fyffe et al. 2011 propose a first-order term based on photometric surface normals, which eliminates the piecewise-constant artifact, but still suffers from cracks in the geometry wherever the photometric normals are biased away from the true geometric normals. Beeler et al. 2010 approximate second order smoothing in an iterative framework, and compute anisotropic smoothing weights to avoid over-smoothing sharp features. These two techniques may be combined in a framework: smoothing term favors neighboring points in the plane defined by the photometric surface normal, weighted by anisotropic smoothing weights which was update between each iteration of message passing:

$$\psi_{st}(x_s, x_t) = w_{st} \frac{r^2}{x_s + x_t} \min_i ((n_{i;p_s} \cdot (p_s - p_t))^2 + (n_{i;p_t} \cdot (p_s - p_t))^2)$$

where r is the angular resolution of the cylinder displacement map, $p_s$ is the point corresponding to the cylinder coordinate (s, $x_S$), $n_i$; $p_s$ is the photometric normal seen at $p_s$ in camera i, $w_{st}=w_{h; s}+w_{h; t}$ if sites s and t are horizontal neighbors or $w_{v; s}+w_{v; t}$ if s and t are vertical neighbors, and $w_{h; s}$, $w_{v; s}$ are respectively the horizontal and vertical anisotropic smoothing weights at site s. The denominator $x_s+x_t$ makes the smoothing term invariant to the distance from the cylinder axis. For anisotropic smoothing weights, the gradient of the diffuse albedo and the gradient of the photometric surface normal (which we obtain by finite differences) may be employed, since these are available and often correlate to surface curvature. The horizontal weights are as follows, with vertical weights likewise:

$$w_{h;s} = W \exp(-\beta_\alpha (\alpha_{s+h} - \alpha_{s-h})^2 - \beta_n (n_{s+h} - n_{s-h})^2),$$

where s+h is the next horizontal neighbor of site s, s−h is the previous horizontal neighbor of site s, $\alpha_s$ and ns are respectively the diffuse albedo and photometric surface normal at site s obtained as in the texture mapping step (detailed below), and W, $\beta\alpha$, $\beta n$ are user-tunable parameters.

Geometry Reconstruction—Minimization of the Cost Function

Optimization of the first equation above may be performed using an adaptive domain message passing framework, called herein TRW-SAD (Algorithm 1):

---

Algorithm 1 The proposed TRW-SAD iteration.

--- for all nodes s ∈ $\mathcal{V}$ in the order of increasing i(s) do
  // Compute belief:
  for j ∈ 1 ... |$d_s$| do $$b_{s:j} \leftarrow \phi_s(d_{s:j}) + \sum_{(t,s) \in \mathcal{E}} \min_k (m_{ts:k} + \psi_{st}(d_{s:j}, d_{t:k}))$$

Sort $d_s$, $b_s$ by increasing $b_s$.
  // Generate domain proposals:
  for j ∈ 1 ... |$p_s$| do
    $p_{s:j} \leftarrow$ new domain proposal.

$$\beta_{s:i} \leftarrow \phi_s(p_{s:j}) + \sum_{(t,s) \in \mathcal{E}} \min_k (m_{t,s:k} + \psi_{st}(p_{s:j}, d_{t:k}))$$

Sort $p_s$, $\beta_s$ by increasing $\beta_s$.
  // Conditionally accept domain proposals:
  for j ∈ 2 ... |$d_s$| do
    for k ∈ 1 ... |$p_s$| do if random(0, 1) ≤ $\exp\left(\frac{1}{T}(b_{s:j} - \beta_{s:k})\right)$ then // The proposal is accepted:
        $d_{s:j} \leftarrow p_{s:k}$
        $b_{s:j} \leftarrow \beta_{s:k}$
        // Mark the proposal as used:
        $\beta_{s:j} \leftarrow \infty$
// Update messages:
for (s, t) ∈ E with i(s) < i(t) do
  for j ∈ 1 ... |$d_s$| do $$m_{st:j} \leftarrow \gamma_{st} b_{s:j} - \min_k (m_{ts:k} + \psi_{st}(d_{s:j}, d_{t:k}))$$

// Reverse ordering:
i(s) ← |V| + 1 − i(s)

---

A domain vector $d_s$ of possible assignments is maintained for each variable s, initialized using stratified random sampling of the continuous range of possible values. A message vector $m_{st}$ or $m_{ts}$ is maintained on each edge (s, t) of the graph, where $m_{st}$ is a message from node s to node t and $m_{ts}$ is a message from node t to node s. All messages are initially set to zero. A belief vector $b_s$ is computed for each node s of the graph in an iterative message passing procedure. The nodes are traversed sequentially according to an ordering i(s), which is reversed after each iteration. Each message passing iteration follows Algorithm 1, where T is a temperature parameter (fixed at 10 in tests), $$\gamma_{st}=1/\max(N_{st},N_{ts}) \text{ and } N_{st}=|\{(s,t)\in\mathcal{E} \ |i(s)>i(t)\}|.$$

By virtue of the sequential nature of the algorithm, $m_{st}$ and $m_{ts}$ may use the same memory for storage, and $b_s$ need not be stored at all. During the final iteration, the solution may be extracted as $x_s=d_{s,j}*$, where $j*=\arg\min_j b_{s;\ j}$. Every time the belief of a variable is computed, a set of domain proposals may be generated according to the updated belief and the incoming messages, and the beliefs for these proposals may be computed as well. The domain values conditionally replaced with domain proposals with an acceptance likelihood based on the beliefs. Importantly, the domain value may never be replaced with the least cost (lowest $b_s$), so that the retained least cost solution will be fused with the proposed samples in subsequent iterations. To enable these adaptive domain updates, the min-marginalization of messages may be delayed until after the message has been passed, instead of before it is passed (as in TRW-S).

Proposal Generation Strategy

The domain proposals generated within this algorithm are intended to sample the domain in the neighborhood of the least cost solution. To generate a set of proposals, start with a set of suggested domain values $S_s$ containing the two domain values $d_{s;\ 1}$ and $d_{s;\ 2}$ corresponding to the two least-cost belief values $b_{s;\ 1}$ and $b_{s;\ 2}$. Add to $S_s$ two suggestions from each neighboring node t: the two domain values $\arg\min_{x_s} \psi_{st}(x_s, d_{t;\ k_1})$ and $\arg\min_{x_s} \psi_{st}(x_s, d_{t;\ k_2})$ corresponding to the two least-cost message values $m_{ts;\ k_1}$ and $m_{ts;\ k_2}$, with $k_1=\arg\min_k m_{ts;\ k}$ and $k_2=\arg\min_{k\neq k_1} m_{ts;\ k}$. This allows the method to recover from poor sampling by encouraging samples that are consistent with neighboring nodes. Finally, add to $S_s$ the minimum and maximum possible displacement values. This results in set $S_s$ with up to 12 domain values for the four-connected stereo matching cost function. Then sort the values in $S_s$ to produce a discretely sampled function $F_s(u)$ which maps values from $\{1, 2, \ldots |S_s|\}$ to domain values. Then draw continuous-valued samples $u_j$~uniform $(1, |S_s|)$ and finally evaluate $p_{s;\ j}=F_s(u_j)$ with linear interpolation. The domain proposals generated in this fashion produce acceptable results, while being faster than sampling/importance resampling on a fine grid. It may be beneficial to not generate any domain proposals at all for the first two iterations of the algorithm, to allow the beliefs to converge somewhat before the domains begin to adapt.

Multi-Resolution Optimization

To improve efficiency, adopt a multi-resolution strategy. Initialize the method by down-sampling the resolution of the input and cylindrical domain by a factor of 16 in each dimension. Then perform TRW-SAD with 16 domain samples, for 16 iterations. Then continue with the next higher resolution (by a factor of 2) until reaching the original resolution. Initialize the TRW-SAD domain of each higher resolution using the final domain of the previous resolution, up-sampled by a factor of 2. Each higher resolution uses half as many TRW-SAD iterations and half as many domain samples as the previous resolution (but no fewer than 4), since up-sampling the previous domain provides a warm start. The domain samples are pruned by truncating the vector $d_s$, which is always ordered by increasing $b_s$. Additionally, after each resolution is processed, use the current geometry estimate to update the visibility estimate, and apply a low-frequency correction to the photometric normals to reduce bias, related to the correction used in Ma et al. 2007. The entire procedure is outlined in Algorithm 2:

---
Algorithm 2 Multi-resolution geometry estimation.
---
for pass p from coarsest to finest resolution do
  // Update resolution:
  Scale all data to resolution required for pass p.
  Up-sample (or initialize) cylindrical domain.
  Prune TRW-SAD domains to max $(2^{4-p},4)$ domain samples.
  // Message passing:
  Execute max $(2^{4-p},4)$ steps of TRW-SAD using (1).
  // Update result:
  Compute vertex world coordinates from displacement map.
  Update visibility estimate from geometry estimate.
  Compute geometry normals from geometry estimate.
  Correct bias in photometric normals using geometry normals.
---

The lack of an initial visibility estimate creates artifacts that are not easily removed in later iterations. To combat this issue, first run the algorithm on only the two smallest resolutions to obtain a coarse visibility estimate. Then re-start the algorithm all over again, but retain the coarse visibility estimate as the initial visibility estimate.

Final Refinement

The TRW-SAD algorithm may become costly with larger resolutions, especially with terms employing normalized cross correlation. Observe that the geometry estimate obtained in the second-to-last resolution pass is close to the final result. Employ a simplified cost function during the final resolution pass without significant effect on the result. The data term is simplified to a quadratic cost centered around the previous geometry estimate, with a fixed magnitude determined by a user-tunable parameter. The smoothing term is simplified by setting the surface normal to a fixed value obtained as in the texture mapping step. The simplified cost function executes an order of magnitude faster than the original cost function. The entire processing time from photographs to final face mesh with textures is one hour running on a single core of a 2008 Intel Xeon processor.

Texture Mapping

Sample textures for the specular albedo, specular normal, diffuse albedo, and red, green, and blue diffuse normals by projecting the geometry vertices back into the camera views, and blending the pixel values in the corresponding photographs. The result is a set of maps in the cylindrical parameterization domain, aligned one-to-one with the geometry. Weight the contribution of each camera with the same camera weighting factor used in the data term. To avoid seams caused by weight discontinuities, feather the weights in the cylindrical domain before computing the final blend.

Results

Results of multiview face capture with the proposed technique are now presented.

As discussed above in the Setup and Acquisition section, capture a subject from five viewpoints near the equator of the LED sphere using DSLR cameras operating in burst mode. Photograph the subject under the complementary spherical gradient illumination conditions of Wilson et al. 2010 in both cross- and parallel polarization states and perform automatic photometric alignment of the acquired data to compensate for any subject motion during acquisition. Following the alignment step, compute diffuse and specular albedo and normal maps from multiple viewpoints which are then used as input for the message passing stereo reconstruction algorithm.

FIG. 2A presents the acquired data of a subject. FIG. 3A presents result of detailed geometry reconstruction. FIG. 3B presents rendering with acquired hybrid normals as described in Ma et al. 2007. FIGS. 14A-14D present additional results of faces scanned in relatively extreme expressions.

Figures 9A, 9B:
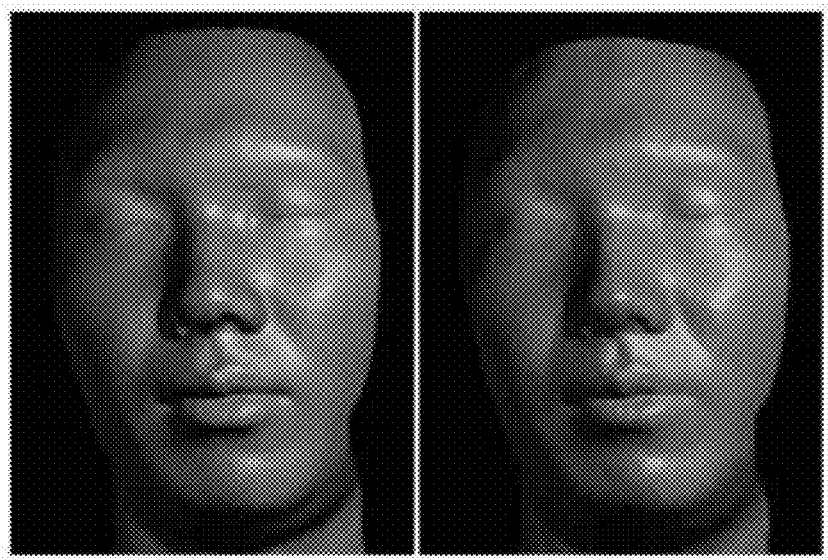
FIGS. 9A and 9B illustrate a geometry reconstruction comparison with a view dependent technique.

FIGS. 9A and 9B illustrate a geometry reconstruction comparison with the view dependent technique of Ma et al. 2007. FIG. 9A illustrates structured light scanning plus specular detail embossing according to the technique of Ma et al. FIG. 9B illustrates a proposed reconstruction based on separated diffuse and specular albedo and normal maps.

FIGS. 9A and 9B present a qualitative comparison of this technique for facial geometry reconstruction (FIG. 9B) with the approach of Ma et al. 2007 that employs structured light scanning for base geometry reconstruction followed by embossing of specular detail according to NEHAB, D RUSINKIEWICZ, S., DAVIS, J., AND RAMAMOORTHI, R. 2005. Efficiently combining positions and normals for precise 3D geometry. ACM TOG 24, 3, 536-543 (hereinafter "Nehab et al. 2005") (FIG. 9A). Here, both techniques employ a single stereo pair of cameras. As can be seen, the approach described achieves very comparable high quality reconstruction without requiring structured light scanning or restricting the acquisition to a single viewpoint.

Figures 10A, 10B, 10C:
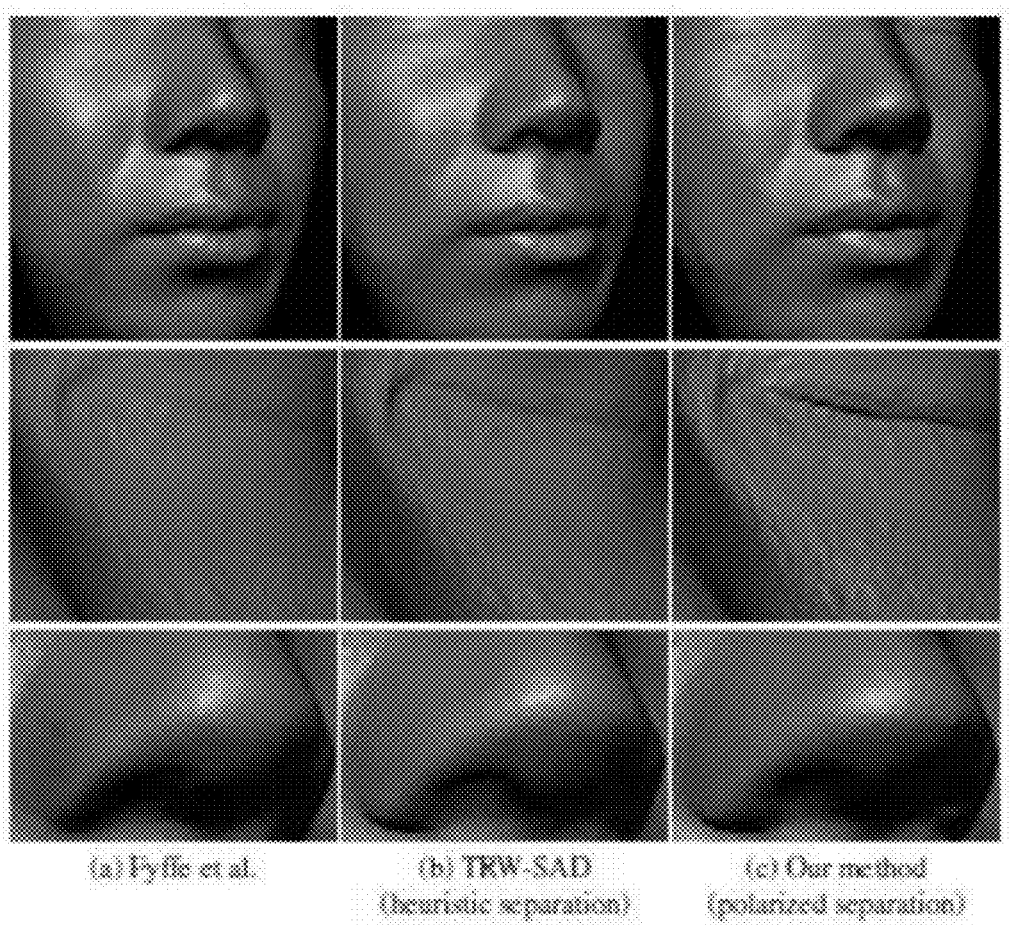
FIGS. 10A-10C presents geometric reconstructive comparison with a multiview technique approach.

FIGS. 10A-10C illustrate a geometry reconstruction comparison with the multiview technique of Fyffe et al. 2011. FIG. 10A illustrates reconstruction based on the technique of Fyffe et al. employing heuristic diffuse-specular separation of albedo and normals. FIG. 10B illustrates the proposed reconstruction algorithm with heuristic diffuse-specular separation. FIG. 10C illustrates the proposed reconstruction algorithm with the proposed polarization based diffuse-specular separation.

FIGS. 10A-10C presents a qualitative comparison of the technique described herein (FIG. 10C) for face capture with the recent approach of Fyffe et al. 2011 (FIG. 10A) which employs heuristic diffuse-specular separation of albedo and normal maps for input to a message passing stereo reconstruction algorithm. Here, simulated unpolarized input data is created for comparison with Fyffe et al. 2011 FIG. 10A illustrates this by adding together the parallel and cross polarized images obtained with the setup. FIG. 10B compares Fyffe et al. with the proposed TRW-SAD algorithm. It results in an improved geometry reconstruction with the same heuristic based diffuse-specular separation of albedo and normals, particularly around discontinuities such as eyelids, nostrils and lips. FIG. 10C is when this technique is employed in conjunction with polarization-based diffuse-specular separation. It results in an even more accurate reconstruction of the facial geometry with greater surface detail.

Figures 11A, 11B:
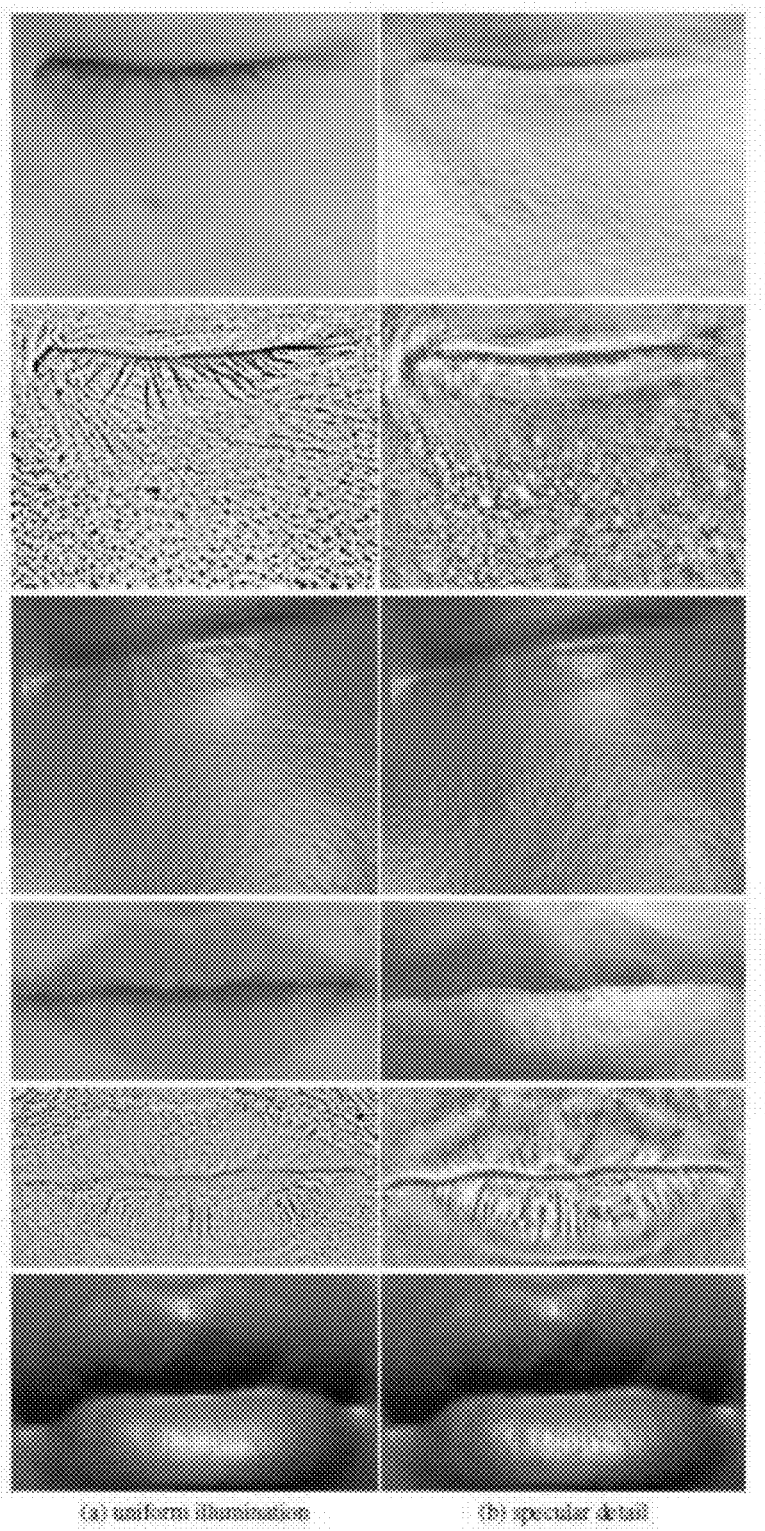
FIGS. 11A and 11B presents a comparison of the mesoscopic detail synthesized from skin texture under uniform diffuse illumination with that obtained from specular normal maps.

FIGS. 11A and 11B illustrate a mesoscopic detail comparison for two different areas of a face. The top-three rows illustrate an upper cheek. The bottom-three rows illustrate lips. FIG. 11A illustrates skin texture under uniform illumination. FIG. 11B illustrates a specular normal map from polarized spherical gradients. Mesoscopic detail from skin texture (rows two and five) incorrectly classifies some convexities and dark hair as concavities, while failing to record some fine wrinkles captured in the specular normals when embossed on base geometry (rows three and six).

FIGS. 11A and 11B presents a comparison of the mesoscopic detail synthesized from skin texture under uniform diffuse illumination Beeler et al. 2010 with that obtained from specular normal maps. While considerable qualitative surface detail can be derived from the texture alone, not all of this detail matches up to more directly observable surface detail obtained from specular reflection. In particular, some convexities on the surface and dark hair can be misinterpreted as concavities on the surface due to skin pores and wrinkles while some fine wrinkle detail that is captured in the specular reflection can be completely missing in the skin texture due to subsurface scattering.

Figures 12A, 12B, 12C:
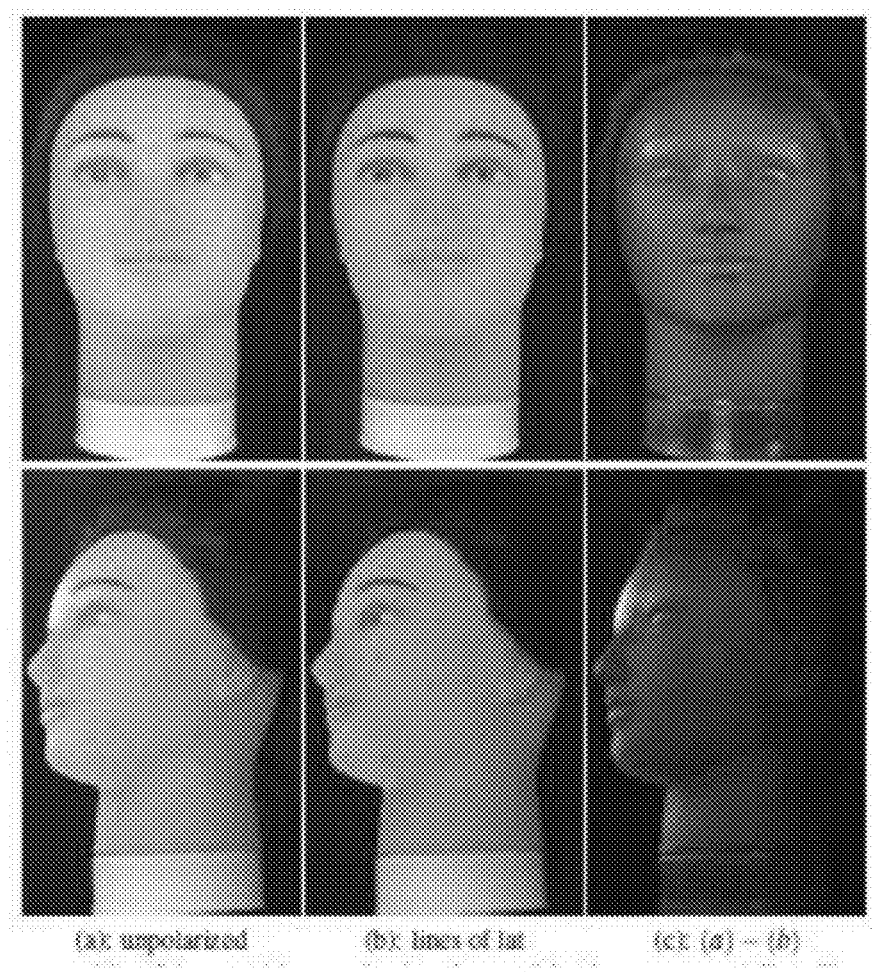
FIGS. 12A-12C present an application of a proposed polarization technique to a recently proposed passive illumination setup for multiview face scanning.

FIGS. 12A-12C illustrate lines-of-lat polarization with the setup of BRADLEY, D., HEIDRICH, W., POPA, T., AND SHEFFER, A. 2010. High resolution passive facial performance capture. ACM Trans. Graph. 29 (July), 41:1-41:10 (hereinafter "Bradley et al. 2010"). The top-row is a frontal viewpoint. The bottom-row is a side viewpoint. FIG. 12A uses unpolarized illumination. FIG. 12B uses light panels polarized in the lines of latitude pattern. FIG. 12C depicts specular reflection that is cancelled by the proposed polarization pattern.

FIGS. 12A-12C present an application of this proposed polarization technique to a recently proposed passive illumination setup for multiview face scanning Bradley et al. 2010. A plastic macquette illuminated by nine flat light panels was photographed to create a uniform illumination condition similar to the approach of Bradley et al. 2010. When employing unpolarized lighting (FIG. 12A), there is significant specular reflection in the photographs that can adversely affect stereo correspondence. Employing sheets of linear polarizer on the light panels oriented along the lines of latitude while mounting vertical linear polarizers on the cameras eliminates most of the undesirable specular reflections in the photographs in FIG. 12B.

Discussion of Limitations—Lat-Long Polarization

The lat-long patterns may not achieve perfect specular cancellation in the cross-polarized state compared to the view-dependent pattern of Ma et al. 2007. But the performance may be remarkably good both visually and in simulation, canceling 99.88% of the specular reflection over the surface of the sphere, with the worst performance of only 99.63% near grazing angles. Like Ma et al. 2007, the lat-long patterns also produce attenuated specular reflections for upward- and downward-pointing surface orientations due to the Brewster angle. However, these areas are typically outside the region of interest for face scanning and hence this is not a problem in practice. The two lat-long polarization patterns were realized by partitioning the LED sphere into every-other-light banks of polarized lights, reducing the angular resolution of the illumination by half. While this still resulted in sufficient resolution for facial reflection, the lower resolution could cause worse artifacts for more specular materials.

Figures 13A, 13B, 13C:
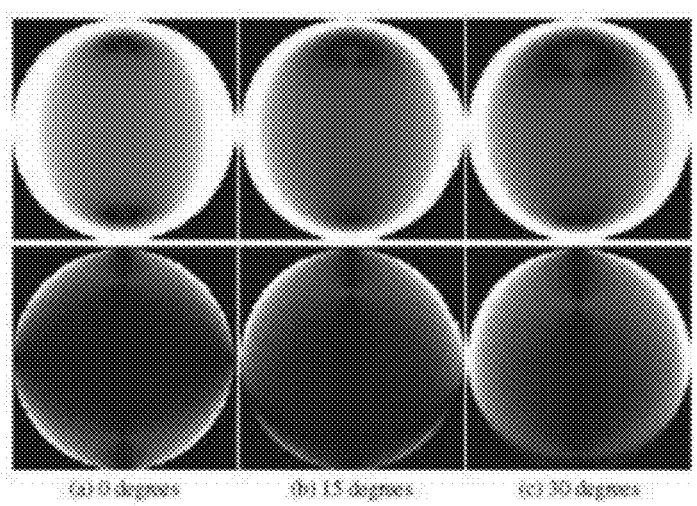
FIGS. 13A-13C illustrate simulated lat-long polarization with a change in viewpoint.
Figures 14A, 14B, 14C, 14D:
FIGS. 14A-14D present additional results of reconstructive geometry for faces in relatively extreme expressions.

FIGS. 13A-13C illustrate simulated lat-long polarization with a change in viewpoint. The top-row uses parallel-polarization. The bottom-row uses cross polarization. FIG. 13A is when the camera is viewing at the equator (0 degrees). FIG. 13B is when the camera is viewing from 15 degree above the equator. FIG. 13C is when the camera is viewing from 30 degree above the equator.

An LED sphere could be configured to produce either polarization state at each light position. The lat-long patterns also result in progressive degradation in the quality of diffuse-specular separation as the camera viewpoint is moved above or below the equator, as illustrated in FIGS. 13A-13C. However, this degradation is very gradual and the method works well up to 20 degrees away from the equator; at 15 degrees, the average amount of un-cancelled specular resolution is still just 1%.

Conclusion

The polarized spherical gradient illumination technique has been generalized to multiview acquisition, demonstrating high quality facial capture and rendering with acquired diffuse and specular reflectance information. The proposed lat-long polarization patterns enable high quality multiview diffuse-specular separation of spherical illumination from just two photographs, and it scales well to many cameras as it only requires low-cost fixed linear polarizers in front of cameras and light sources. The polarization pattern may be applied to an alternate passive illumination face capture setup. The proposed polarization technique should have applications in general multiview acquisition of real world objects and material reflectance. A novel multi-resolution adaptive domain message passing stereo reconstruction algorithm has also been presented which derives detailed facial geometry from both the diffuse and specular reflectance of the face. Here, the need for merging multiple depth maps has been eliminated by formulating the multiview stereo reconstruction in a common parameterization domain. The technique may be applied to dynamic facial performances, and also to investigate other parameterization domains for stereo reconstruction of more complex shapes such as human bodies.

The data processing system 109 that has been discussed herein is implemented with a computer system configured to perform the functions that have been described herein for it. The computer system includes one or more processors, memory devices (e.g., random access memories (RAMs), read-only memories (ROMs), and/or programmable read only memories (PROMS)), tangible storage devices (e.g., hard disk drives, CD/DVD drives, and/or flash memories), system buses, video processing components, network communication components, input/output ports, and/or user interface devices (e.g., keyboards, pointing devices, displays, microphones, sound reproduction systems, and/or touch screens).

The computer system may include software (e.g., one or more operating systems, device drivers, application programs, and/or communication programs). When software is included, the software includes programming instructions and may include associated data and libraries. When included, the programming instructions are configured to implement one or more algorithms that implement one more of the functions of the computer system, as recited herein. Each function that is performed by an algorithm also constitutes a description of the algorithm. The software may be stored on one or more non-transitory, tangible storage devices, such as one or more hard disk drives, CDs, DVDs, and/or flash memories. The software may be in source code and/or object code format. Associated data may be stored in any type of volatile and/or non-volatile memory.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, the multiview face capture systems that have been described herein may also be used to capture the detailed geometry and reflectance of other types of objects, some with analogous features. The fact that the system is being used for any of these different purposes, however, would not alter the fact that the system is also suitable for facial capture.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications that have been cited in this disclosure are incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to these corresponding structures, materials, or acts or to their equivalents.

The scope of protection is limited solely by the claims that now follow. That scope is intended and should be interpreted to be as broad as is consistent with the ordinary meaning of the language that is used in the claims when interpreted in light of this specification and the prosecution history that follows, except where specific meanings have been set forth, and to encompass all structural and functional equivalents.

Relational terms such as first and second and the like may be used solely to distinguish one entity or action from another, without necessarily requiring or implying any actual relationship or order between them. The terms "comprises," "comprising," and any other variation thereof when used in connection with a list of elements in the specification or claims are intended to indicate that the list is not exclusive and that other elements may be included. Similarly, an element preceded by an "a" or an "an" does not, without further constraints, preclude the existence of additional elements of the identical type.

None of the claims are intended to embrace subject matter that fails to satisfy the requirement of Sections 101, 102, or 103 of the Patent Act, nor should they be interpreted in such a way. Any unintended coverage of such subject matter is hereby disclaimed. Except as just stated in this paragraph, nothing that has been stated or illustrated is intended or should be interpreted to cause a dedication of any component, step, feature, object, benefit, advantage, or equivalent to the public, regardless of whether it is or is not recited in the claims.

The abstract is provided to help the reader quickly ascertain the nature of the technical disclosure. It is submitted with the understanding that it will not be used to interpret or limit the scope or meaning of the claims. In addition, various features in the foregoing detailed description are grouped together in various embodiments to streamline the disclosure. This method of disclosure should not be interpreted as requiring claimed embodiments to require more features than are expressly recited in each claim. Rather, as the following claims reflect, inventive subject matter lies in less than all features of a single disclosed embodiment. Thus, the following claims are hereby incorporated into the detailed description, with each claim standing on its own as separately claimed subject matter.

The invention claimed is:

1. A multiview face capture system for acquiring detailed facial geometry with high resolution diffuse and specular photometric information from multiple viewpoints, the system comprising:
   a lighting system configured to illuminate a face from multiple directions with light that is polarized:
      substantially parallel to a reference axis during a parallel polarization mode of operation; and
      substantially perpendicular to the reference axis during a perpendicular polarization mode of operation;
   a camera system that includes one or more cameras, each configured to capture an image of the face along a materially different optical axis and each having a linear polarizer configured to polarize light traveling along its optical axis in a direction that is substantially parallel to the reference axis; and a controller configured to control the lighting system and/or the camera system so as to cause each of the one or more cameras to capture an image of the face while the lighting system is in the parallel polarization mode of operation and again while the lighting system is in the perpendicular polarization mode of operation.

2. The multiview face capture system of claim 1 wherein:
the lighting system is configured to cause, during a spherical mode of operation, the illumination of the face during both polarization modes of operation to be substantially spherical; and the controller is configured to control the lighting system and/or the camera system so as to cause each of the one or more cameras to capture an image of the face during the spherical mode of operation while the lighting system is in the parallel polarization mode of operation and again while the lighting system is in the perpendicular polarization mode of operation.

3. The multiview face capture system of claim 1 wherein:
the lighting system is configured to cause, during a first gradient mode of operation, the intensity of the illumination of the face to vary in a gradient across a first directional axis during both polarization modes of operation; and the controller is configured to control the lighting system and/or the camera system so as to cause each of the one or more cameras to capture an image of the face during the first gradient mode of operation while the lighting system is in the parallel polarization mode of operation and again while the lighting system is in the perpendicular polarization mode of operation.

4. The multiview face capture system of claim 3 wherein:
the lighting system is configured to cause, during a second gradient mode of operation, the intensity of the illumination of the face to vary in a gradient across a second gradient axis that is substantially perpendicular to the first gradient axis during both polarization modes of operation; and the controller is configured to control the lighting system and/or the camera system so as to cause each of the one or more cameras to capture an image of the face during each of the first and the second gradient modes of operation while the lighting system is in the parallel polarization mode of operation and again while the lighting system is in the perpendicular polarization mode of operation.

5. The multiview face capture system of claim 3 wherein:
the lighting system is configured to cause, during a third gradient mode of operation, the intensity of the illumination of the face to vary in a gradient across a third gradient axis that is substantially perpendicular to the first and the second gradient axes during both polarization modes of operation; and the controller is configured to control the lighting system and/or the camera system so as to cause each of the one or more cameras to capture an image of the face during each of the first, second, and third gradient modes of operation while the lighting system is in the parallel polarization mode of operation and again while the lighting system is in the perpendicular polarization mode of operation.

6. The multiview face capture system of claim 1 wherein the lighting system includes a light source that generates the illumination from each of the multiple directions that is physically separate from the light source that generates the illumination from each of the other multiple directions.

7. The multiview face capture system of claim 1 wherein the lighting system includes a flat panel of separately-controllable pixels.

8. The multiview face capture system of claim 1 wherein each optical axis is substantially perpendicular to the reference axis.

9. The multiview face capture system of claim 1 wherein each optical axis passes through the approximate vertical center of the face.

10. The multiview face capture system of claim 1 wherein the camera system includes multiple cameras, each configured to capture an image of the face along a materially different optical axis and each having a linear polarizer configured to polarize light traveling along its optical axis in a direction that is substantially parallel to the reference axis.

11. The multiview face capture system of claim 10 wherein each optical axis is substantially perpendicular to the reference axis.

12. The multiview face capture system of claim 1 wherein each optical axis passes through the approximate vertical center of the face.

13. Non-transitory, tangible, computer-readable storage media containing a program of instructions configured to cause a computer system running the program of instructions to generate data representative of 3D geometry of a face based at least in part on data that is representative of a specular surface normal map of the face from multiple viewpoints.

14. The media of claim 13 wherein the program of instructions causes the computer system running the program of instructions to generate the data representative of the 3D geometry of the face also based on a specular albedo map of the face from multiple viewpoints.

15. The media of claim 13 wherein the program of instructions causes the computer system running the program of instructions to generate the data representative of the 3D geometry of the face also based on a diffuse albedo map of the face from multiple viewpoints.

16. The media of claim 13 wherein the program of instructions causes the computer system running the program of instructions to generate the data representative of the 3D geometry of the face also based on a specular albedo map of the face and a diffuse albedo map of the face, each from multiple viewpoints.

17. The media of claim 13 wherein the program of instructions causes the computer system running the program of instructions to compute a cylindrical displacement map X that minimizes substantially the following graphical cost function:

$$E(X) = \sum_{s \in V} \phi_s(x_s) + \sum_{(s,t) \in E} \psi_{st}(x_s, x_t)$$

where V is a set of all pixel sites in the displacement map X, E is a set of edges connecting neighboring sites, $x_s$ is a displacement distance from cylinder axis at site s, $\phi_s$, is a data term, and $\psi_{st}$ is a smoothing term.

18. A face capture system for acquiring detailed facial geometry with high resolution diffuse and specular photometric information from multiple viewpoints, the system comprising:

a lighting system configured to illuminate a face from multiple directions with polarized light that is polarized:

substantially parallel to a reference axis during a parallel polarization mode of operation; or substantially perpendicular to the reference axis during a perpendicular polarization mode of operation; and a camera system that includes one or more cameras, each configured to capture an image of the face along a materially different optical axis and each having a linear polarizer configured to polarize light traveling along its optical axis in a direction that is substantially parallel to the reference axis while the lighting system is in the parallel polarization mode of operation or the perpendicular polarization mode of operation.

19. The face capture system of claim 18 wherein the camera system includes multiple cameras, each configured to capture an image of the face along a materially different optical axis and each having a linear polarizer configured to polarize light traveling along its optical axis in a direction that is substantially parallel to the reference axis.

20. The multiview face capture system of claim 18 wherein the lighting system is configured to cause, during a spherical mode of operation, the illumination of the face to be substantially spherical.

* * * * *